(12) United States Patent
Wang

(10) Patent No.: US 10,638,320 B2
(45) Date of Patent: Apr. 28, 2020

(54) WIRELESS NETWORK TYPE DETECTION METHOD AND APPARATUS, AND ELECTRONIC DEVICE

(71) Applicant: Alibaba Group Holding Limited, George Town (KY)

(72) Inventor: Baochu Wang, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/422,777

(22) Filed: May 24, 2019

(65) Prior Publication Data

US 2019/0281457 A1 Sep. 12, 2019

Related U.S. Application Data

(63) Continuation of application No. 16/019,840, filed on Jun. 27, 2018, now Pat. No. 10,306,471.

(30) Foreign Application Priority Data

Jun. 28, 2017 (CN) .......................... 2017 1 0506456

(51) Int. Cl.
*H04W 12/06* (2009.01)
*H04L 29/06* (2006.01)
(Continued)

(52) U.S. Cl.
CPC ........... *H04W 12/06* (2013.01); *H04L 63/083* (2013.01); *H04W 12/08* (2013.01); *H04W 48/16* (2013.01); *H04W 84/12* (2013.01); *H04W 88/02* (2013.01)

(58) Field of Classification Search
CPC ............. H04L 63/1441; H04L 12/4641; H04L 12/4645; H04L 12/467; H04L 29/06;
(Continued)

(56) References Cited

U.S. PATENT DOCUMENTS 7,107,309 B1 9/2006 Geddes et al.
7,546,357 B2 * 6/2009 Manchester ............ H04L 29/06
709/220

(Continued)

FOREIGN PATENT DOCUMENTS

CN 101516126 8/2009
CN 103634329 3/2014
(Continued)

OTHER PUBLICATIONS

International Search Report and Written Opinion of the International Searching Authority issued in International Application No. PCT/US2018/040101 dated Sep. 28, 2018, 8 pages.
(Continued)

*Primary Examiner* — Nathan S Taylor
(74) *Attorney, Agent, or Firm* — Fish & Richardson P.C.

(57) ABSTRACT

A determination is made as to whether a password is required for connecting to a wireless network. In response to determining that no password is required for connecting to the wireless network, data is retrieved from at least one predefined network address through the wireless network. A determination is made as to whether a secondary login verification is required for connecting to the wireless network based on, at least, the retrieved data from the at least one predefined network address.

18 Claims, 8 Drawing Sheets

(51) Int. Cl.
  *H04W 12/08* (2009.01)
  *H04W 48/16* (2009.01)
  *H04W 84/12* (2009.01)
  *H04W 88/02* (2009.01)

(58) Field of Classification Search
  CPC ........... H04L 29/08072; H04L 63/0227; H04L 63/08; H04L 63/083; H04L 63/0861; H04L 63/0876; H04L 63/1433; H04L 63/162; H04L 63/168; H04W 12/06; H04W 48/20; H04W 84/12; H04W 88/08; H04W 12/08; H04W 48/16; G06F 13/20; G06F 1/1632; G06F 21/32; G06F 21/41; G06F 21/606; G06F 21/629; H04M 1/7253
  USPC ........................................................ 455/411
  See application file for complete search history.

(56) References Cited

U.S. PATENT DOCUMENTS

| | | | |
|---|---|---|---|
| 7,568,107 B1 | 7/2009 | Rathi et al. | |
| 8,316,228 B2 | 11/2012 | Winslow | |
| 8,495,714 B2 | 7/2013 | Jones et al. | |
| 8,549,600 B2* | 10/2013 | Shedrinsky | H04L 63/0428 726/7 |
| 9,131,373 B2* | 9/2015 | Patil | H04W 12/06 |
| 9,396,316 B1* | 7/2016 | Altman | G06F 21/316 |
| 9,596,606 B1* | 3/2017 | Palmer | H04W 12/08 |
| 9,853,970 B2 | 12/2017 | Glik et al. | |
| 10,057,227 B1* | 8/2018 | Hess | H04L 63/08 |
| 10,135,860 B2* | 11/2018 | Buddepalli | H04L 63/105 |
| 10,306,471 B2 | 5/2019 | Wang | |
| 2006/0203738 A1* | 9/2006 | Fok | H04B 17/26 370/252 |
| 2008/0025278 A1 | 1/2008 | Hoecker et al. | |
| 2011/0162060 A1* | 6/2011 | Vijayakumar | H04L 12/413 726/13 |
| 2013/0024915 A1* | 1/2013 | Jones | H04W 12/06 726/5 |
| 2013/0040603 A1* | 2/2013 | Stahlberg | H04L 63/126 455/410 |
| 2013/0155876 A1* | 6/2013 | Potra | H04W 36/14 370/248 |
| 2013/0155879 A1* | 6/2013 | He | H04W 72/1257 370/252 |
| 2013/0166738 A1 | 6/2013 | Ivershen | |
| 2013/0179970 A1 | 7/2013 | Bhola et al. | |
| 2014/0189808 A1* | 7/2014 | Mahaffey | H04L 63/083 726/4 |
| 2015/0358314 A1* | 12/2015 | Glik | H04L 63/0861 726/7 |
| 2016/0165067 A1* | 6/2016 | Turner | H04W 4/029 370/352 |
| 2016/0285841 A1* | 9/2016 | Marcy | H04L 63/10 |
| 2017/0195307 A1* | 7/2017 | Jones-McFadden | H04L 63/083 |
| 2017/0195366 A1* | 7/2017 | Jones-McFadden | H04L 63/20 |
| 2017/0206351 A1* | 7/2017 | Jay | G06F 21/552 |
| 2018/0083943 A1* | 3/2018 | Bowman | H04L 63/08 |
| 2018/0302391 A1* | 10/2018 | Jones | H04L 63/083 |
| 2018/0352386 A1* | 12/2018 | Gunasekara | H04W 4/043 |
| 2019/0007834 A1 | 1/2019 | Wang | |

FOREIGN PATENT DOCUMENTS

| | | |
|---|---|---|
| CN | 103856458 | 6/2014 |
| CN | 103905395 | 7/2014 |
| CN | 104105167 | 10/2014 |
| CN | 104380776 | 2/2015 |
| CN | 106488453 | 3/2017 |
| JP | 2007116509 | 5/2007 |
| JP | 2011166600 | 8/2011 |
| KR | 20070078212 | 7/2007 |
| KR | 20110005081 | 1/2016 |
| KR | 20140109444 | 12/2017 |
| TW | I254550 | 5/2006 |
| WO | WO 2017024842 | 2/2017 |
| WO | WO 2017166131 | 10/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/US2018/040101, dated Jun. 5, 2019, 5 pages.

* cited by examiner

WIRELESS NETWORK TYPE DETECTION METHOD AND APPARATUS, AND ELECTRONIC DEVICE

CROSS-REFERENCE TO RELATED APPLICATIONS

This application is a continuation of U.S. application Ser. No. 16/019,840, filed on Jun. 27, 2018, which claims priority to Chinese Patent Application No. 201710506456.9, filed on Jun. 28, 2017, which and each application is hereby incorporated by reference in its entirety.

TECHNICAL FIELD

The present application relates to the field of communication technology, and in particular, to a wireless network type detection method and apparatus, and an electronic device.

BACKGROUND

With the development of the mobile Internet, accessing a wireless network through Wi-Fi has become more and more frequent for electronic devices. But at the same time, Wi-Fi security issues have become more and more prominent. Electronic devices may connect to unsecured Wi-Fi hotspots, causing personal information leaks, password leaks, or account theft.

To facilitate user connections and allow more users to access unsecured Wi-Fi hotspots, most unsecured Wi-Fi hotspots do not set login passwords. Therefore, currently, many security-tool applications will check, after an electronic device connects to Wi-Fi, whether the current Wi-Fi requires a password for connection. If no password is required for connection, the security-tool applications will block the electronic device from accessing the Wi-Fi hotspot, or display a security prompt. However, sometime after connecting to the password-free Wi-Fi hotspot, users are still required to have a secondary login verification. A secondary login verification means that although a device does not need a password to connect to a Wi-Fi hotspot, a login screen will pop up on the device when accessing the Internet, requiring the user to enter a username and password to access the Internet.

SUMMARY

Based on this, the present application provides a wireless network type detection method and apparatus, and an electronic device.

A wireless network type detection method includes: determining whether a currently connected wireless network requires a password for connection; after determining that no password is required, accessing at least one specified network address based on the specified network address; and determining, by determining whether the specified network address can be successfully accessed, whether the currently connected wireless network requires secondary login verification.

Optionally, the determining whether a currently connected wireless network requires a password for connection includes: calling a wireless network password management interface provided by an operating system, obtaining a call result, and determining, based on the call result, whether the currently connected wireless network requires a password for connection.

Optionally, the specified network address includes a network address of a user-defined API, and the API is used to return specified identification information when the API is accessed; and the determining whether the specified network address can be successfully accessed includes: obtaining an access result of accessing the network address of the API, and determining, based on whether the access result includes the specified identification information, whether the network address of the API can be successfully accessed.

Optionally, the specified network address includes network addresses of at least two different web pages; and the determining whether the specified network address can be successfully accessed includes: obtaining web page data returned after a network address of each of the web pages is accessed, and determining, by comparing the page data of the web pages, whether each accessed web page jumps to a secondary login verification page, so as to determine whether the network address of each of the web pages can be successfully accessed.

Optionally, the page data of the web page includes the network address of the web page; and the determining, by comparing the page data of the web pages, whether each accessed web page jumps to a secondary login verification page includes: updating the page data of each of the web pages, where the updating includes deleting the network address included in the page data of each of the web pages or replacing the network address included in the page data of each of the web pages with unified identification data; and comparing updated page data of the web pages to determine whether the page data is the same, and determining, based on a comparison result, whether each accessed web page jumps to the secondary login verification page.

A wireless network type detection apparatus includes: a connection password determining module, configured to determine whether a currently connected wireless network requires a password for connection; an access module, configured to: after it is determined that no password is required, access at least one specified network address based on the specified network address; and a login verification module, configured to determine, by determining whether the specified network address can be successfully accessed, whether the currently connected wireless network requires secondary login verification.

Optionally, the connection password determining module is further configured to: call a wireless network password management interface provided by an operating system, obtain a call result, and determine, based on the call result, whether the currently connected wireless network requires a password for connection.

Optionally, the specified network address includes a network address of a user-defined API, and the API is used to return specified identification information when the API is accessed; and the login verification module is further configured to: obtain an access result of accessing the network address of the API, and determine, based on whether the access result includes the specified identification information, whether the network address of the API can be successfully accessed.

Optionally, the specified network address includes network addresses of at least two different web pages; and the login verification module is further configured to: obtain web page data returned after a network address of each of the web pages is accessed, and determine, by comparing the page data of the web pages, whether each accessed web page jumps to a secondary login verification page, so as to determine whether the network address of each of the web pages can be successfully accessed.

Optionally, the page data of the web page includes the network address of the web page; and the login verification module is further configured to: update the page data of each of the web pages, where the updating includes deleting the network address included in the page data of each of the web pages or replacing the network address included in the page data of each of the web pages with unified identification data; and compare updated page data of the web pages to determine whether the page data is the same, and determine, based on a comparison result, whether each accessed web page jumps to the secondary login verification page.

An electronic device includes: a processor; and a memory, configured to store an instruction that can be executed by the processor, where the processor is configured to: determine whether a currently connected wireless network requires a password for connection; after determining that no password is required, access at least one specified network address based on the specified network address; and determine, by determining whether the specified network address can be successfully accessed, whether the currently connected wireless network requires secondary login verification.

Technical solutions provided in the embodiments of the present application can include the following beneficial effects:

In the wireless network type detection method in the present application, after determining that the currently connected wireless network does not require a password for connection, the specified network address is further accessed. Whether the specified network address can be successfully accessed is also determined. If the network address can be accessed, it can be determined that the currently connected wireless network is a password-free wireless network. If the network address cannot be accessed, it can be determined that the wireless network requires secondary login verification. In the implementations of the present application, whether a password-free wireless network needs secondary login verification for connection can be accurately determined. Therefore, a user can be accurately warned about a wireless network security risk, reducing the false positive rate and the interruption to the user.

It should be understood that, the previous general description and the following detailed description are exemplary and explanatory only, and constitute no limitation on the present application.

BRIEF DESCRIPTION OF DRAWINGS

Accompanying drawings included in the present application constitute a part of the present application, illustrate embodiments consistent with the present application, and together with the description are used to explain principles of the present application.

DESCRIPTION OF EMBODIMENTS

Exemplary embodiments are described in detail here, and examples of the exemplary embodiments are illustrated in accompanying drawings. When the following description refers to the accompanying drawings, same numerals in different accompanying drawings indicate the same or similar elements unless otherwise specified. Implementations described in the following exemplary embodiments do not represent all embodiments consistent with the present application. Instead, they are merely examples of apparatuses and methods consistent with some aspects of the present application as set forth in the appended claims.

The terms used in the present application are merely for the purpose of illustrating specific embodiments, and are not intended to limit the present application. The terms "a", "said" and "the" of singular forms used in the present application and the appended claims of the present application are also intended to include plural forms, unless the context indicates otherwise. It should also be understood that, the term "and/or" used herein indicates and includes any or all possible combinations of one or more associated listed items.

It should be understood that, although terms such as "first", "second", and "third" are used in the present application to describe various types of information, the information should not be limited by these terms. These terms are merely used to differentiate information of a same type. For example, without departing from the scope of the present application, first information can also be referred to as second information, and similarly, second information can also be referred to as first information. Depending on the context, the word "if" as used here can be interpreted as "when" or "in case that . . . " or "in response to determining".

In the embodiments of the present application, Wi-Fi is a technology that allows an electronic device to connect to a wireless local area network (WLAN), and allow terminals such as a personal computer and a handheld device (for example, a PDA or a mobile phone) to wirelessly interconnect with each other.

A Wi-Fi hotspot is a device that can provide a shared network resource and allow other terminals (for example, a mobile phone and or notebook computer) to connect to a network via a Wi-Fi connection. For example, if wireless network interconnection can be performed via the Wi-Fi connection in an effective coverage area of a radio wave of a wireless router, the wireless router is referred to as a "Wi-Fi hotspot".

Wi-Fi secondary login verification: although a password is not required when a device is connected to a Wi-Fi hotspot, when accessing the Internet, a login screen will pop up to require the user to enter a username and password. This login connection method is called "Wi-Fi secondary login authentication".

Figure 1:
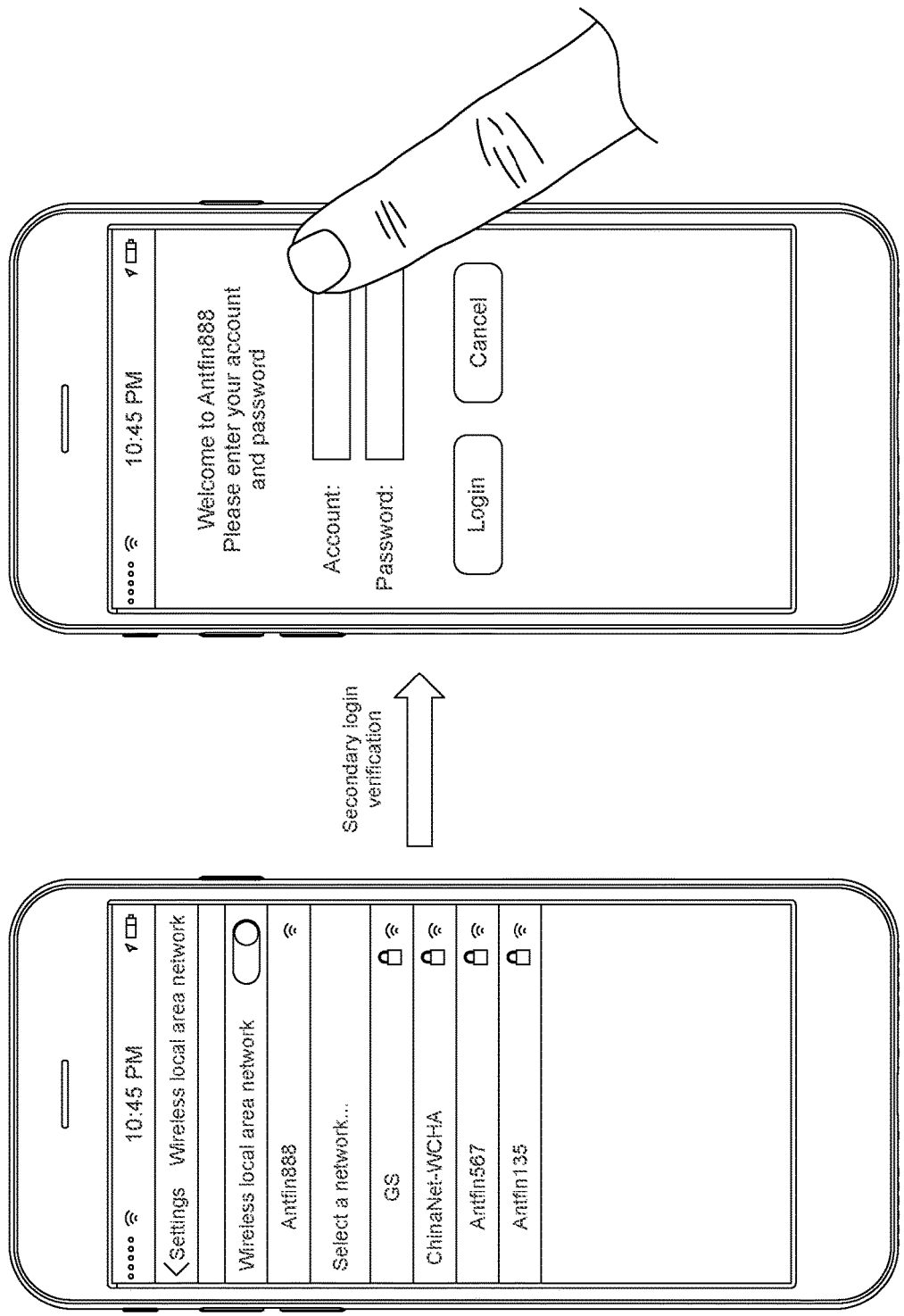
FIG. 1 is a schematic diagram illustrating connection to a wireless network through Wi-Fi by an electronic device in an exemplary embodiment of the present application.

FIG. 1 is a schematic diagram illustrating connection to a wireless network through Wi-Fi by an electronic device in an exemplary embodiment of the present application. When connecting to a wireless network hotspot, the electronic device can access the wireless network without using a password. However, a user needs to enter a username and password when the electronic device accesses the Internet through the wireless network. Therefore, the wireless network is not a password-free Wi-Fi in a practical sense.

The wireless network type detection solution in the embodiments of the present application, after determining that a currently connected wireless network does not require password for connection, a specified network address can further be accessed. Whether the specified network address can be successfully accessed is also determined. If yes, it can be determined that the currently connected wireless network is a password-free wireless network. If no, it can be determined that the wireless network requires secondary login verification. In the embodiments of the present application, whether a password-free wireless network needs secondary login verification for connection can be accurately determined. Therefore, a user can be accurately warned about a wireless network security risk, reducing the false positive rate and the interruption to the user. The following describes in detail the embodiments of the present application.

Figure 2A:
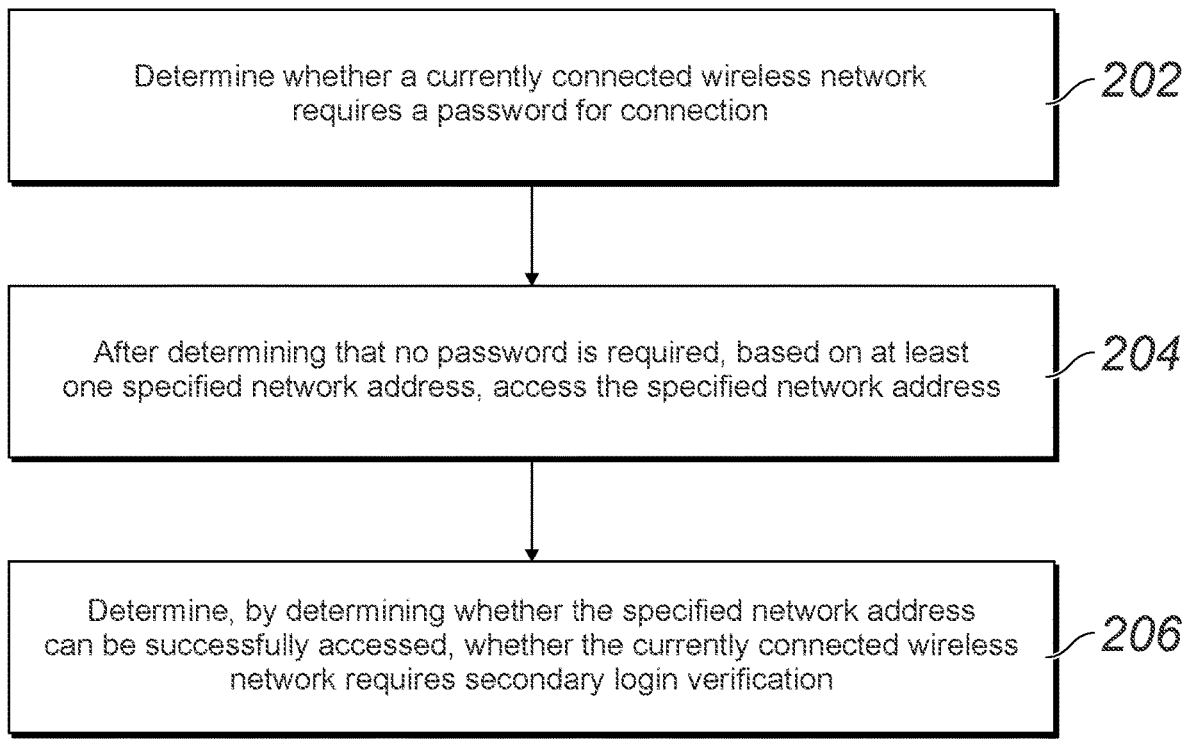
FIG. 2A is a flowchart illustrating a wireless network type detection method in an exemplary embodiment of the present application.

FIG. 2A is a flowchart illustrating a wireless network type detection method in an exemplary embodiment of the present application. The wireless network type detection method includes the following steps 202 to 206.

Step 202: Determine whether a currently connected wireless network requires a password for connection.

Step 204: After determining that no password is required, based on at least one specified network address, access the specified network address.

Step 206: Determine, by determining whether the specified network address can be successfully accessed, whether the currently connected wireless network requires secondary login verification.

Figure 2B:
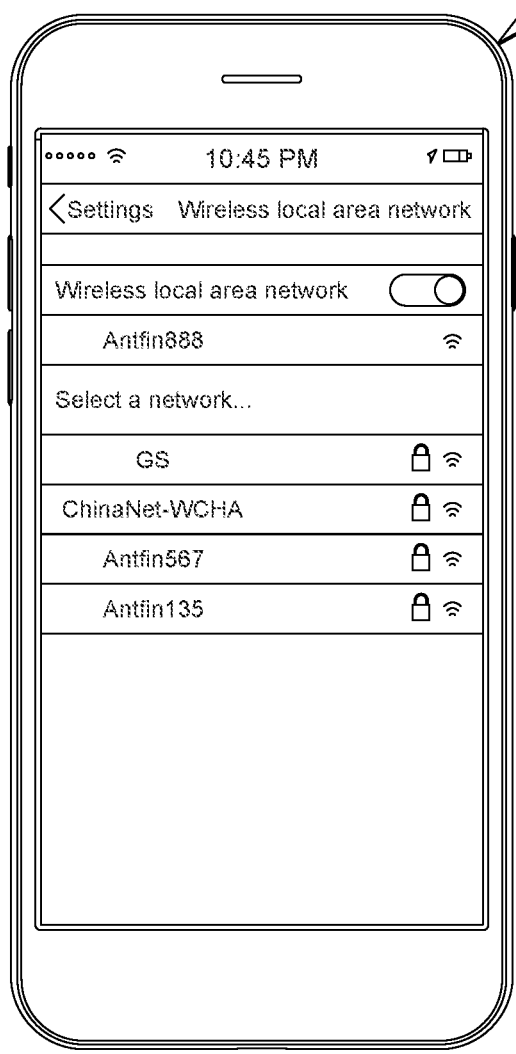
FIG. 2B is a schematic diagram illustrating a wireless network type detection solution of an electronic device in an exemplary embodiment of the present application.

The method in this embodiment can be applied to an electronic device configured with a wireless network module. For example, the method can be applied to an application installed in the electronic device. The application can detect a type of a wireless network that the electronic device accesses, and provide a security risk warning about the wireless network for a user based on a detected type. The electronic device in this embodiment can include a smartphone, a tablet computer, a personal digital assistant, a multimedia player, etc. This type of electronic device is configured with a wireless network module, and can access a wireless network. FIG. 2B is a schematic diagram illustrating a wireless network type detection solution of an electronic device in an exemplary embodiment of the present application.

When an electronic device connects to a wireless network provided by a router, a gateway device, or another network terminal, the application can determine that the electronic device connects to the wireless network in a plurality of ways, and determine whether a password is required for the access. For example, if the application program has the permission, the electronic device can determine that the electronic device has access to the wireless network Wi-Fi hotspot by directly communicating with the wireless network module, or by reading an interface provided by the wireless network module or by using another method. The application program can also determine whether the accessed wireless network Wi-Fi hotspot requires a password for connection. In another example, the application program may have a permission and an operating system of the electronic device provides an interface, the application program can make the determinations based on a call result of calling the interface. In practical application, the application program can make determinations flexibly based on a plurality of factors such as an operating system used by the electronic device, an operating system permission that an application vendor can obtain, and an interface provided by the operating system.

In an optional implementation method, the determining whether a currently connected wireless network requires a password for connection includes: calling a wireless network password management interface provided by an operating system, obtaining a call result, and determining, based on the call result, whether the currently connected wireless network requires a password for connection.

Taking an Android operating system as an example, the operation system provides a wireless network password management interface for a wireless network module. The application can call the interface, and determine, based on a call result of calling the interface, whether the currently connected wireless network requires a password for connection. The following illustrates code for calling the wireless network password management interface:

```
/**
 * It is determined, by using a WiFiConfiguration.KeyMgmt management
mechanism, whether the currently connected Wi-Fi requires a password for access.
 *
 * @return true: requiring a password for access, false: requiring no password for
access
 */
public static boolean needPassword(Context context) {
    WiFiManager    WiFiManager    =    (WiFiManager)
context.getSystemService(Context.WiFi_SERVICE);
        if (WiFiManager != null) {
            List<WiFiConfiguration>    WiFiConfiguration    =
WiFiManager.getConfiguredNetworks( );
                if (WiFiConfiguration != null && WiFiConfiguration.size( ) > 0) {
                    for (WiFiConfiguration configuration : WiFiConfiguration) {
                        if (configuration != null && configuration.status ==
WiFiConfiguration.Status.CURRENT) {
                            if
(configuration.allowedKeyManagement.get(WiFiConfiguration.KeyMgmt.NONE)) {
                                return false;
                            } else {
                                return true;
                            }
                        }
```

```
        }
      }
    }
    //A connection password is required by default.
    return true;
}
```

WiFiManager.getConfiguredNetworks( ) represents the wireless network password management interface.

Main logic of the code is to detect: whether WiFiConfiguration.allowedKeyManagement of the Wi-Fi hotspot includes a WiFiConfiguration.KeyMgmt.NONE field. If yes, it is considered that no password is required; or if no, it is considered that a password is required. When no password is required for wireless network connection, the call result includes the KeyMgmt.NONE field.

Taking an iOS operating system as an example, the iOS operating system provides an API (named NEHotspotNetwork) for obtaining a Wi-Fi list through mainly the following steps: applying to Apple for a permission to develop Network Extension, applying for a description file including Network Extension, configuring Info.plist, configuring entitlements, obtaining Wi-Fi list code implementation by iOS, and obtaining a Wi-Fi list callback.

After NEHotspotNetwork is called, returned information of NEHotspotNetwork includes:

SSID: Wi-Fi name;

BSSID: MAC address of a site;

signal Strength: Wi-Fi signal strength, with a value ranging from 0.0-1.0;

secure: indicates whether a network is secure (a value is false for Wi-Fi requiring no password for access);

autoJoined: indicates whether the device automatically connects to the Wi-Fi;

justJoined: indicates whether the network is just accessed; and chosenHelper: indicates whether HotspotHelper is selected for the network.

Therefore, based on security in the call result, it can be determined whether the currently connected wireless network Wi-Fi hotspot requires a password.

However, after accessing wireless networks without using a password, some networks still require secondary login verification of the user. Therefore, in this embodiment, whether secondary login verification is required is determined by specifying one or more network addresses in advance and accessing the specified network address. Assuming that secondary login verification is required, the user can access the Internet only after entering an account name and password. If the user does not perform secondary login verification, the electronic device cannot obtain desired network data after accessing the Internet. Based on this, in this embodiment, one or more network addresses are specified and the specified network address is accessed. If the specified network address is successfully accessed, it indicates that the accessed wireless network does not require secondary login verification. If the specified network address fails to be accessed, the accessed wireless network requires secondary login verification.

In practical use, whether the access is successful can be determined in a plurality of ways. For example, network data corresponding to the specified network address can be pre-configured. After the specified network address is accessed, an access result is obtained, and whether the access is successful is determined based on whether the access result is the same as the pre-configured network data.

In this embodiment, the specified network address includes a network address of a user-defined API, and the API is used to return specified identification information when accessed.

The determining whether the specified network address can be successfully accessed includes: obtaining an access result of accessing the network address of the API, and determining, based on whether the access result includes the specified identification information, whether the network address of the API can be successfully accessed.

In this embodiment, an API can be developed on a server in advance. An application can access a network address of the API, and the network address can be an IP address. If a network is reachable, the specified identification information can be obtained after the API is accessed. If the network is unreachable, the specified identification information cannot be obtained. As such, it can be determined whether the network address of the API can be successfully accessed and whether secondary login verification is required.

In some other examples, pre-development work may not be performed. The network address can be a network address of a public web page. Page content of the web page can be pre-analyzed and pre-stored. It is determined whether an access result of accessing the web page includes the pre-stored page content, so as to determine whether the access is successful. However, the web page content may change dynamically. Therefore, in this embodiment, network addresses of two or more web pages can be specified, to provide a more reliable determining method. Specifically, the present application provides the following embodiment.

The specified network address includes network addresses of at least two different web pages; and the determining whether the specified network address can be successfully accessed includes: obtaining web page data returned after a network address of each of the web pages is accessed, and determining, by comparing the page data of the web pages, whether each accessed web page jumps to a secondary login verification page, so as to determine whether the network address of the web page can be successfully accessed.

Two or more existing public web pages, or web pages with relatively simple page content can be selected as the above-mentioned web pages, to reduce data traffic consumption. The network address can include a domain name address or an IP address of the web page. If the network is unreachable, each accessed web page jumps to the secondary login verification page. In this situation, page data of the secondary login verification page is returned, and the returned page data is basically the same. If the network is reachable, after the two or more web pages are accessed, page data of each web page is returned, and the page data of each web page is different. Therefore, in this embodiment, it can be determined, by comparing the page data of the web pages, whether each accessed web page jumps to the secondary login verification page, so as to determine whether the network address of each of the web pages can be successfully accessed.

After access is initiated to a network address, page data returned from the network address can be obtained. The page data includes the network address of the web page. If the network is unreachable, the returned page data includes the page data of the secondary login verification page. In this situation, all page data is the same except for the network address. Based on this, in this embodiment, for improving determining efficiency and accuracy, the determining, by comparing the page data of the web pages, whether each accessed web page jumps to a secondary login verification page includes: updating the page data of each of the web pages, where the updating includes deleting the network address included in the page data of each of the web pages or replacing the network address included in the page data of each of the web pages with unified identification data; and comparing updated page data of the web pages to determine whether the page data is the same, and determining, based on a comparison result, whether each accessed web page jumps to the secondary login verification page.

In this embodiment, after the network addresses in page data are deleted or replaced with the unified identification data, the updated page data of the web pages is compared to determine whether the updated page data is the same. Therefore, comparison efficiency and accuracy can be significantly improved.

The following describes in detail the present application by using two embodiments.

Figure 2C:
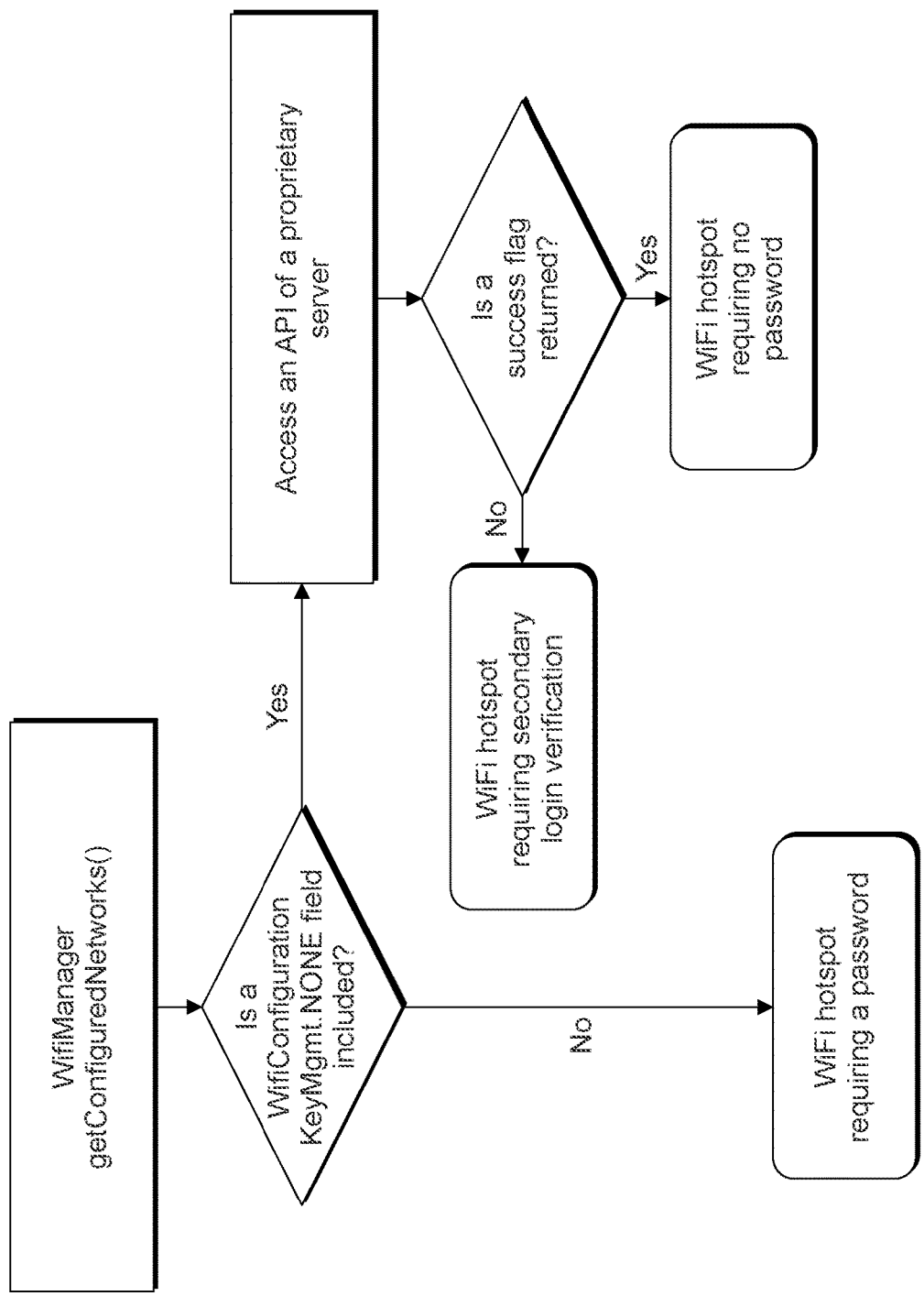
FIG. 2C is a flowchart illustrating a wireless network type detection method in an exemplary embodiment of the present application.

FIG. 2C is a flowchart illustrating a wireless network type detection method in an exemplary embodiment of the present application. In FIG. 2C, an Android operating system is used as an example. A wireless network password management interface of the operating system, that is, WiFiManager.getConfiguredNetworks( ), is called and determining is performed based on whether a call result includes a WiFiConfiguration.KeyMgmt.NONE field. If not, it is considered that a password is required and a determining result is immediately returned. If yes, it can be further determined whether a currently connected wireless network Wi-Fi hotspot requires secondary login verification.

Specifically, an API can be developed on a proprietary server, and the API is used to return a simple success flag. An application directly accesses the API. If the success flag can be received, it is considered that the application can directly access the Internet through the currently connected wireless network Wi-Fi hotspot and secondary login verification is not required. Otherwise, it is considered that the secondary login verification is required.

Figure 2D:
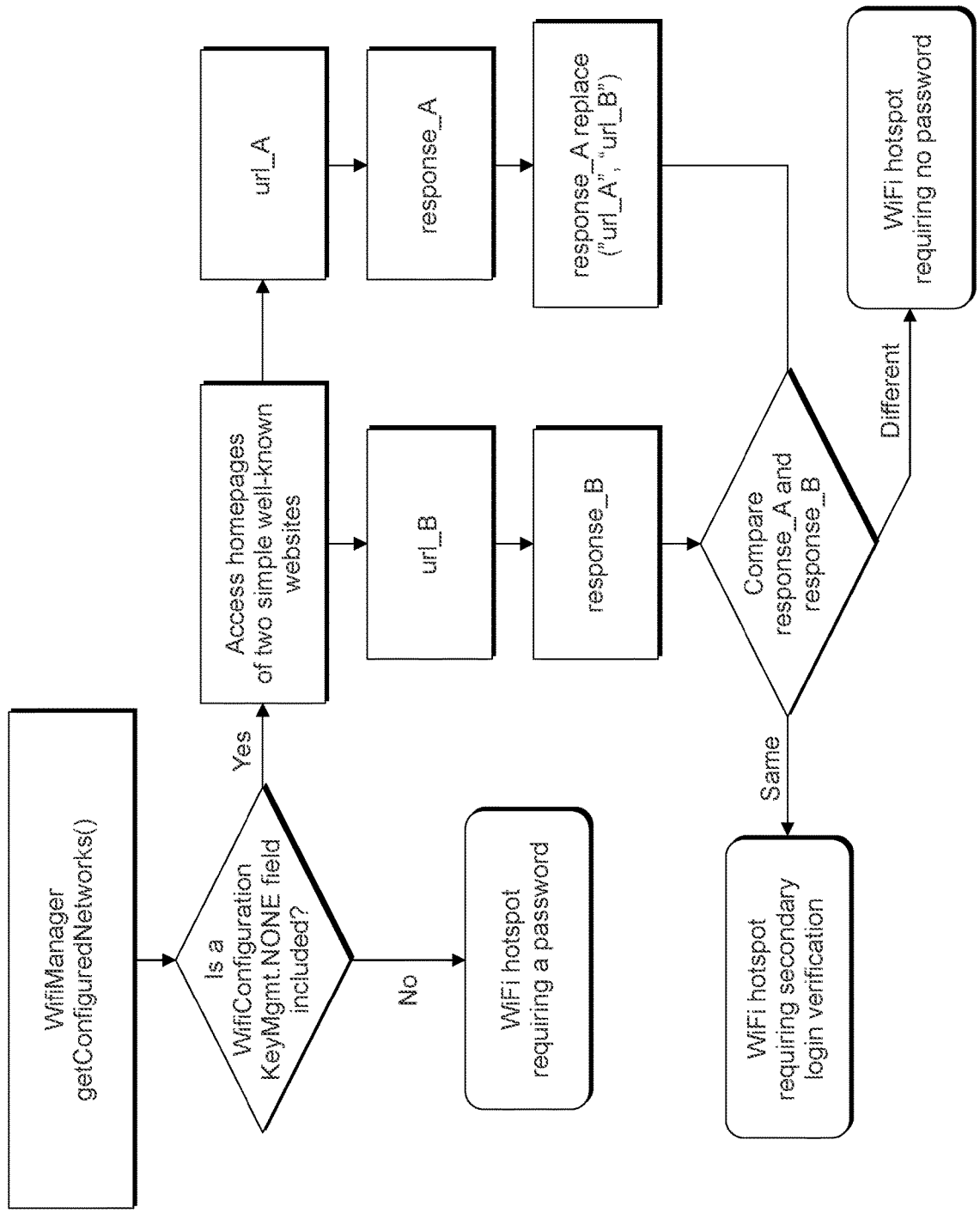
FIG. 2D is a flowchart illustrating a wireless network type detection method in an exemplary embodiment of the present application.

FIG. 2D is a flowchart illustrating another wireless network type detection method in an exemplary embodiment of the present application. In FIG. 2D, an Android operating system is used as an example. A wireless network password management interface of the operating system, that is, WiFiManager.getConfiguredNetworks( ), is called and determining is performed based on whether a call result includes a WiFiConfiguration.KeyMgmt.NONE field. If not, it is considered that a password is required and a determining result is immediately returned. If yes, it can be further determined whether a currently connected wireless network Wi-Fi hotspot requires secondary login verification.

Specifically, compared to the development of the API on the proprietary server in FIG. 2C, in this embodiment, addresses of two simple well-known websites (website pages can be as simple as possible to reduce data traffic consumption) can be selected. Assuming that the websites are a website A (the website address is url_A) and a website B (the website address is url_B), the websites addresses url_A and url_B are accessed sequentially, and response data returned from the addresses are stored in corresponding records: response_A and response_B. Finally, content of response_A and response_B is compared.

If the currently connected wireless network Wi-Fi hotspot requires secondary login verification, the accessed websites addresses url_A and url_B both jump to a secondary login verification page, that is, the content of response_A and response_B both includes page data of the same secondary login verification page. Otherwise, response_A and response_B represent content of different websites and are definitely different. Therefore, it can be determined whether the current Wi-Fi requires secondary login verification.

However, since response_A and response_B include a corresponding network address, the network address can be replaced with unified identification data before the comparison between response_A and response_B. In this embodiment, the network address is replaced with url_B. Therefore, response_A.replace ("url_A", "url_B") can be executed, that is, the network address in response_A is replaced with url_B, to eliminate a network address difference in the page data, thereby avoiding a misjudgment and increasing determining efficiency and accuracy.

Corresponding to the foregoing embodiment of the wireless network type detection method, the present application further provides embodiments of a wireless network type detection apparatus and an electronic device that the wireless network type detection apparatus is applied to.

Figure 3:
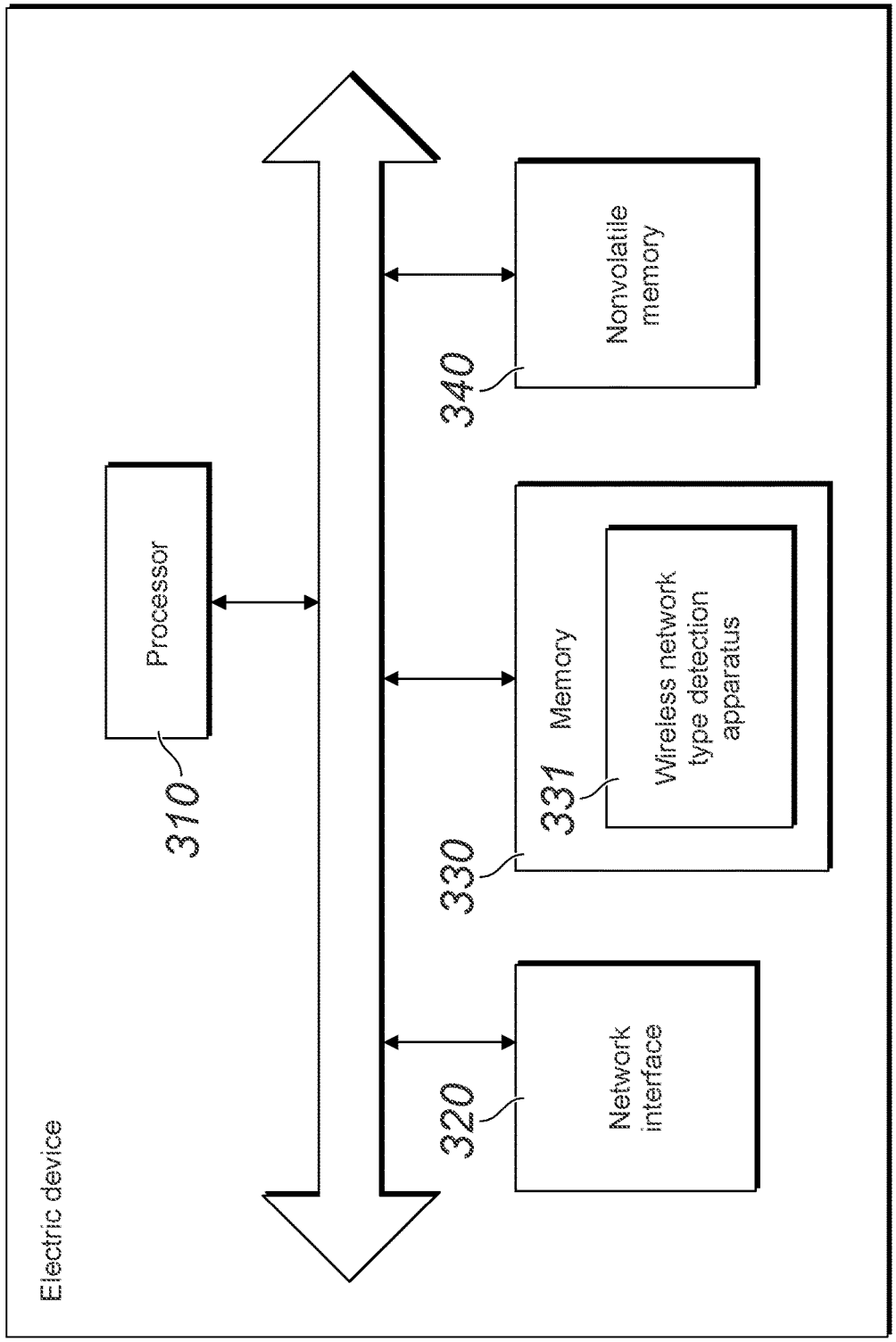
FIG. 3 is a structural hardware diagram illustrating an electronic device including a wireless network type detection apparatus of the present application.

The embodiment of the wireless network type detection apparatus of the present application can be applied to an electronic device. The apparatus embodiment can be implemented by using hardware, software, or a combination of hardware and software. For example, in a software implementation, the wireless network type detection apparatus is a logical apparatus, and is formed when a wireless network type detection processor of the wireless network type detection apparatus reads a corresponding computer program instruction in a nonvolatile memory and executes the computer program instruction in a memory. In a hardware aspect, FIG. 3 is a structural hardware diagram illustrating an electronic device including a wireless network type detection apparatus of the present application. In addition to a processor 310, a memory 330, a network interface 320, and a nonvolatile memory 340 shown in FIG. 3, in this embodiment, the electronic device where the apparatus 331 is located generally can further include other hardware based on an actual function of the computer device. Details are not repeated here.

Figure 4:
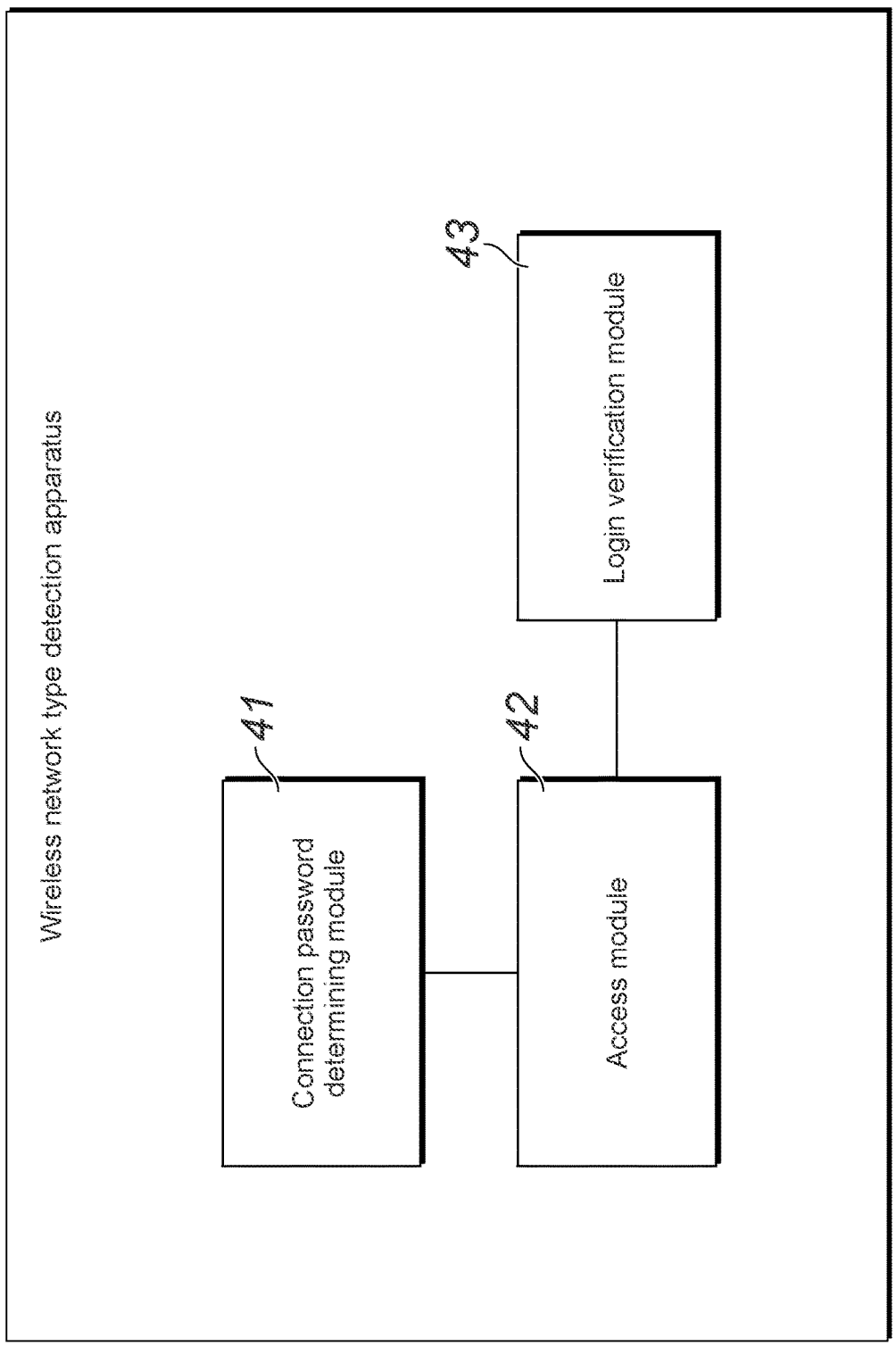
FIG. 4 is a block diagram illustrating a wireless network type detection apparatus in an exemplary embodiment of the present application.

FIG. 4 is a block diagram illustrating a wireless network type detection apparatus in an exemplary embodiment of the present application. The apparatus includes: a connection password determining module 41, configured to determine whether a currently connected wireless network requires a password for connection; an access module 42, configured to: after it is determined that no password is required, access at least one specified network address based on the specified network address; and a login verification module 43, configured to determine, by determining whether the specified network address can be successfully accessed, whether the currently connected wireless network requires secondary login verification.

Optionally, the connection password determining module is further configured to: call a wireless network password management interface provided by an operating system, obtain a call result, and determine, based on the call result, whether the currently connected wireless network requires a password for connection.

Optionally, the specified network address includes a network address of a user-defined API, and the API is used to return specified identification information when the API is accessed; and the login verification module is further configured to: obtain an access result of accessing the network address of the API, and determine, based on whether the access result includes the specified identification information, whether the network address of the API can be successfully accessed.

Optionally, the specified network address includes network addresses of at least two different web pages; and the login verification module is further configured to: obtain web page data returned after a network address of each of the web pages is accessed, and determine, by comparing the page data of the web pages, whether each accessed web page jumps to a secondary login verification page, so as to determine whether the network address of each of the web pages can be successfully accessed.

Optionally, the page data of the web page includes the network address of the web page; and the login verification module is further configured to: update the page data of each of the web pages, where the updating includes deleting the network address included in the page data of each of the web pages or replacing the network address included in the page data of each of the web pages with unified identification data; and compare updated page data of the web pages to determine whether the page data is the same, and determine, based on a comparison result, whether each accessed web page jumps to the secondary login verification page.

An electronic device includes: a processor; and a memory, configured to store an instruction that can be executed by the processor, where the processor is configured to: determine whether a currently connected wireless network requires a password for connection; after determining that no password is required, access at least one specified network address based on the specified network address; and determine, by determining whether the specified network address can be successfully accessed, whether the currently connected wireless network requires secondary login verification.

For details about implementation processes of functions and purposes of the modules in the apparatus, refer to the implementation processes of corresponding steps in the method, and details are not repeated here.

An apparatus embodiment basically corresponds to a method embodiment; therefore, for related parts, refer to partial descriptions in the method embodiment. The described apparatus embodiment is merely an example. The modules described as separate parts can or cannot be physically separate, and parts displayed as modules can or cannot be physical modules, that is, can be located in one position, or can be distributed on a plurality of network modules. Some or all of the modules can be selected based on actual requirements to achieve the objectives of the solutions of the present application. A person of ordinary skill in the art can understand and implement the embodiments of the present application without creative efforts.

Specific embodiments of the present application are described above. Other embodiments fall within the scope of the appended claims. In some situations, the actions or steps recited in the claims can be performed in a different order than in the embodiments and still achieve desirable results. In addition, the processes depicted in the accompanying drawings do not necessarily require the illustrated particular order or sequential order to achieve desirable results. In certain embodiments, multitasking and parallel processing are also possible or can possibly be advantageous.

Those skilled in the art will readily recognize other embodiments of the present application upon consideration of the present application and practice of the invention as applied here. The present application is intended to cover any variation, use, or adaptation of the present application that conforms to general principles of the present application and that include common general knowledge or a technical means in the art that is not claimed in the present application. The present application and embodiments are considered as mere examples, with the actual scope and spirit of the present application indicated by the following claims.

It should be understood that the present application is not limited to the precise structures that have been described above and shown in the accompanying drawings, and that various modifications and changes can be made without departing from the scope of the present application. The scope of the present application is limited only by the appended claims.

The foregoing descriptions are merely preferred examples of the embodiments of the present application, but are not intended to limit this application. Any modification, equivalent replacement, and improvement made without departing from the spirit and principle of the present invention shall fall within the protection scope of the present invention.

Figure 5:
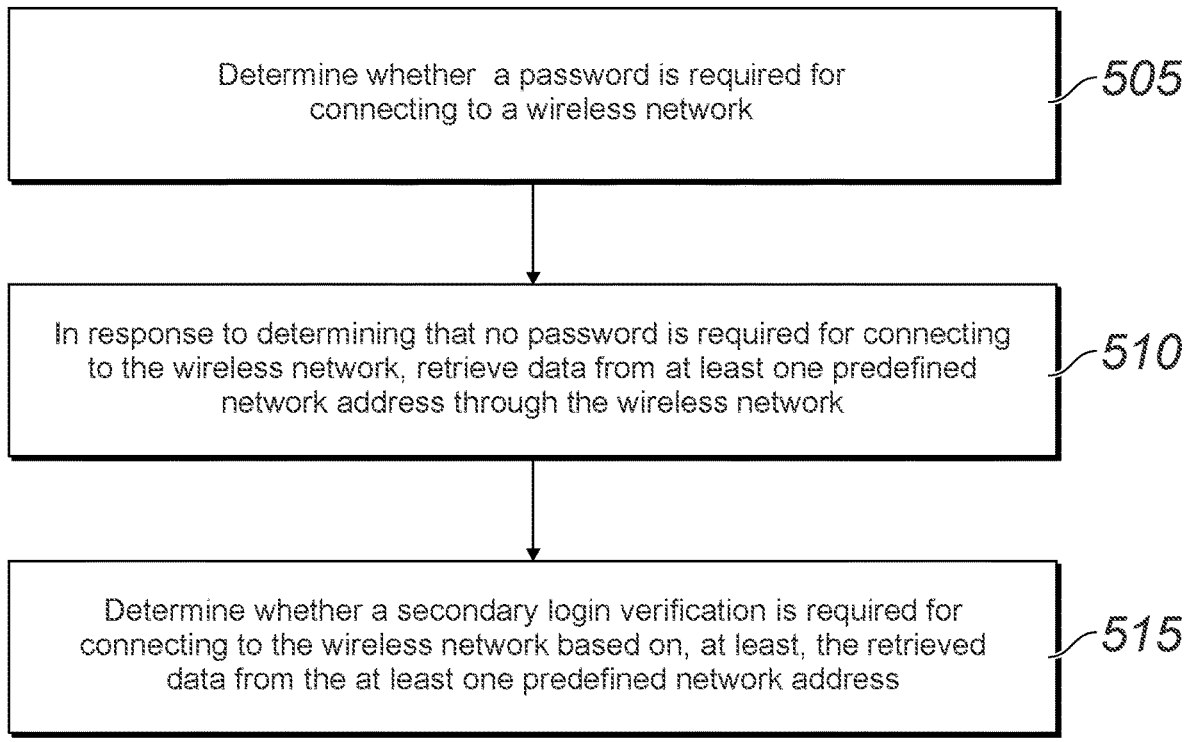
FIG. 5 is a flowchart illustrating an example of a computer-implemented method for determining a wireless network type, according to an implementation of the present disclosure.

FIG. 5 is a flowchart illustrating an example of a computer-implemented method 500 for determining a wireless network type, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 505, a determination is made as to whether a password is required for connecting to a wireless network. In some implementations, the determination is made automatically by a mobile device (such as, a mobile phone, a laptop) when connecting to the wireless network. The wireless network can be a wireless local area network (WLAN). A Wi-Fi hotspot (such as a wireless router) can provide a Wi-Fi connection to the WLAN when the mobile device is in a coverage area of the Wi-Fi hotspot. For example, a user can select the Wi-Fi hotspot on the mobile device to start a Wi-Fi connection to the WLAN. In some implementations, the mobile device can automatically start a Wi-Fi connection to the WLAN when detecting the Wi-Fi hotspot. When requested, the Wi-Fi hotspot can ask the mobile device to provide a password in order to connect the mobile device to the WLAN. In some implementations, the Wi-Fi hotspot can connect the mobile device to the WLAN without a password from the mobile device.

In some implementations, in response to determining that a password is required for connecting to the wireless network, a determination is made that the connection to the wireless network is a secure connection. In such a situation, a user can input a password on the mobile device to connect to the wireless network. If the mobile device has a stored password for the wireless network, the mobile device can provide the password automatically to connect to the wireless network. Since the connection to the wireless network is determined to be a secure connection, there is no security risk warning about the connection displayed on the mobile device, and the connection to the wireless network is not blocked by, for example, a security application on the mobile device.

In some implementations, to determine whether a password is required for connecting to a wireless network, a mobile device can call, for example, a wireless network password management interface provided by an operating system of the mobile device. The mobile device can obtain a call result in response to calling the wireless network password management interface. Then, the mobile device can determine whether a password is required for connecting to the wireless network based on, at least, the call result. For example, if the operating system is an ANDROID operating system, WiFiManager.getConfiguredNetworks( ) can be the wireless network password management interface in the ANDROID operating system. The mobile device can call the interface. Based on, at least, the call result, the mobile device can determine whether WiFiConfiguration.allowedKeyManagement of a Wi-Fi hotspot of the wireless network includes a WiFiConfiguration.KeyMgmt.NONE field. If the field is included, the mobile device can determine that no password is required for connecting to the wireless network. However, if the field is not included, the mobile device can determine that a password is required for connecting to the wireless network. If the operating system is an APPLE iOS operating system, NEHotspotNetwork can be an application program interface (API) in the APPLE iOS operating system. The mobile device can call the API. Based on, at least, a security indicator in the call result, the mobile device can determine whether a password is required for connecting to the wireless network. From 505, method 500 proceeds to 510.

At 510, in response to determining that no password is required for connecting to the wireless network, data is retrieved from at least one predefined network address through the wireless network. In some implementations, data is retrieved automatically from the at least one predefined network address through the wireless network in response to the determination. For example, for enterprise client applications, a user-defined API can be developed on a proprietary server of the enterprise. The at least one predefined network address can include a network address associated with the user-defined API. The API can be configured to return specified identification information (such as, a "Success" identifier) when the API is accessed. For personal client applications, at least two network addresses, each associated with a different web page, can be predefined. Each web page can be an existing well-known public web page. In some implementations, to reduce data traffic, web pages with simple page content can be used to select the predefined network addresses. From 510, method 500 proceeds to 515.

At 515, a determination is made as to whether a secondary login verification is required for connecting to the wireless network. The determination is made based on, at least, the retrieved data from the at least one predefined network address. In some implementations, the determination is made automatically by a mobile device. In some implementations, although a mobile device does not need a password to connect to a Wi-Fi hotspot of the wireless network at step 505, a secondary login verification can exist when the mobile device accesses the Internet through the wireless network. For example, a login screen, requiring a username, a password, or a combination of both, can pop up on the mobile device when the mobile device accesses the Internet through the wireless network. In some cases, the Wi-Fi hotspot of the wireless network can redirect the access request to a secondary login verification page, instead of the at least one predefined network address, if a secondary login verification is required for connecting to the wireless network. In some implementations, the Wi-Fi hotspot can pass the access request to the at least one predefined network address through the wireless network without a secondary login verification from the mobile device.

In some implementations, when the at least one predefined network address includes the network address associated with the user-defined API, the mobile device can access the network address associated with the user-defined API through the wireless network. The mobile device can obtain a network response to accessing the network address associated with the user-defined API through the wireless network is obtained. Then, the mobile device can determine whether a secondary login verification is required for connecting to the wireless network. The determination is made based on, at least, whether the obtained network response includes specified identification information.

For example, if the network response includes a "Success" identifier, the mobile device can determine that the access request has reached the network address associated with the user-defined API without a secondary login verification. Therefore, a determination can be made by the mobile device that no secondary login verification is required for connecting to the wireless network. However, if the network response does not include a "Success" identifier, the mobile device can determine that the access request has not reached the network address associated with the user-defined API without a secondary login verification. Therefore, a determination can be made by the mobile device that a secondary login verification is required for connecting to the wireless network.

In some implementations, when the at least one predefined network address includes at least two network addresses associated with different web pages, the mobile device can access each network address of the at least two network addresses associated with different web pages. For each accessed network address, web page data, including first web page data associated with one of the at least two network addresses and second web page data associated with a different one of the at least two network addresses, is obtained. Then, the first web page data is compared to the second web page data to determine whether the first web page data matches the second web page data. In response to determining that the first web page data matches the second web page data, the mobile device can determine that a secondary login verification is required for connecting to the wireless network.

For example, if websites A and B, with web addresses URL_A and URL_B, respectively, are accessed, returned web page data, response_A and response_B, respectively, are obtained and compared. If response_A and response_B are different, the mobile device can determine that the access request has reached both websites A and B without a secondary login verification. Therefore, a determination can be made by the mobile device that no secondary login verification is required for connecting to the wireless network. However, if response_A and response_B are the same, the mobile device can determine that the access request has not reached either website A or B without a secondary login verification. For example, the access request to both websites A and B is redirected to a same secondary login verification page, and as a result, response_A and response_B represent the same content of the secondary login verification page. Therefore, a determination can be made by the mobile device that a secondary login verification is required for connecting to the wireless network.

In some implementations, comparing the first web page data to the second web page data can include updating the first web page data and the second web page data to remove corresponding network address data or to replace the corresponding network address data with unified identification data, and comparing the updated first web page data to the updated second web page data. For example, if response_A includes URL_A and response_B includes URL_B, a comparison of response_A and response_B will be different if URL_A and URL_A are different, even if a secondary login verification is required for connecting to the wireless network. In such a situation, URL_A in response_A and URL_B in response_B can be deleted before the comparison. In some implementations, URL_A in response_A and URL_B in response_B can be replaced with a same web address before the comparison. For example, URL_A in response_A can be replaced with URL_B, URL_B in response_B can be replaced with URL_A, or URL_A in response_A and URL_B in response_B can be both replaced with URL_C before the comparison.

In some implementations, in response to determining that no secondary login verification is required for connecting to the wireless network, a determination is made that the connection to the wireless network is not a secure connection. A warning message can be displayed on the mobile device to remind a user of potential security risk of connecting to the wireless network. In some implementations, a connection to the wireless network is blocked automatically by, for example, a security application on the mobile device in response to the determination that the connection to the wireless network is not a secure connection.

In some implementations, in response to determining that a secondary login verification is required for connecting to the wireless network, a determination is made that the connection to the wireless network is a secure connection. In such a situation, a user can input a username, a password, or a combination of both on the mobile device to connect to the wireless network. If the mobile device has a stored username, a stored password, or a combination of both for the wireless network, the mobile device can provide the username, the password, or a combination of both automatically to connect to the wireless network. Since the connection to the wireless network is determined to be a secure connection, there is no security risk warning about the connection displayed on the mobile device, and the connection to the wireless network is not blocked by, for example, a security application on the mobile device. After 515, method 500 stops.

A user can use application software installed on a mobile device to connect to a wireless network through, for example, a Wi-Fi hotspot. Normally, insecure Wi-Fi hotspots do not have login passwords. However, some secure Wi-Fi hotspots also do not have login passwords while implementing a secondary login verification process. As a result, the mobile device cannot differentiate an insecure Wi-Fi hotspot without a login password from a secure Wi-Fi hotspot with a secondary login verification. A security application on the mobile device will treat a secure Wi-Fi hotspot with a secondary login verification the same way as an insecure Wi-Fi hotspot without a login password, hence results in poor user experience when using the security application. The subject matter described in this specification can be used to differentiate an insecure Wi-Fi hotspot without a login password from a secure Wi-Fi hotspot with a secondary login verification. For example, after determining that a Wi-Fi hotspot does not have a login password, another determination is made as to whether the Wi-Fi hotspot without a login password implements a secondary login verification process. As a result, a Wi-Fi hotspot, without a login password and with a secondary login verification, can be accurately identified as a secure Wi-Fi hotspot. In doing so, accurate network security risk of a Wi-Fi connection can be provided to a user, thereby reducing a misjudgment rate of the Wi-Fi connection and disturbance to the user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   determining that no password is required for connecting to a wireless network;
   in response to determining that no password is required for connecting to the wireless network, retrieving data from at least one predefined network address through the wireless network; and
   determining that a secondary login verification is required for connecting to the wireless network based on, at least, the data from the at least one predefined network address,
   wherein the at least one predefined network address comprises a first network address to access first web page data and a second network address to access second web page data, the first network address and the second network address being associated with a user-defined application program interface (API), and determining whether a secondary login verification is required for connecting to the wireless network comprises:
      accessing the network address associated with the user-defined API through the wireless network,
      obtaining a network response to accessing the network address associated with the user-defined API through the wireless network, and
      determining that the secondary login verification is required for connecting to the wireless network based on, at least, matching the first web page data and the second web page data to generate a matching result indicating that the network response comprises specified identification information.

2. The computer-implemented method of claim 1, further comprising in response to determining that a password is required for connecting to the wireless network, determining that the connection to the wireless network is a secure connection.

3. The computer-implemented method of claim 1, further comprising:

in response to determining that no secondary login verification is required for connecting to the wireless network, determining that the connection to the wireless network is not a secure connection; and in response to determining that a secondary login verification is required for connecting to the wireless network, determining that the connection to the wireless network is a secure connection.

4. The computer-implemented method of claim 1, wherein the wireless network is a wireless local area network (WLAN).

5. The computer-implemented method of claim 1, wherein determining that no password is required for connecting to the wireless network includes:
   calling, by a mobile device, a wireless network password management interface provided by an operating system of the mobile device;
   obtaining, by the mobile device, a call result in response to calling the wireless network password management interface; and
   determining, by the mobile device, that no password is required for connecting to the wireless network based on at least the call result.

6. The computer-implemented method of claim 5, wherein the operating system is an ANDROID operating system or an APPLE iOS operating system.

7. A non-transitory, computer-readable medium storing one or more instructions executable by a computer system to perform operations comprising:
   determining that no password is required for connecting to a wireless network;
   in response to determining that no password is required for connecting to the wireless network, retrieving data from at least one predefined network address through the wireless network; and
   determining that a secondary login verification is required for connecting to the wireless network based on, at least, the retrieved data from the at least one predefined network address,
   wherein the at least one predefined network address comprises a first network address to access first web page data and a second network address to access second web page data the first network address and the second network address being associated with a user-defined application program interface (API), and determining that the secondary login verification is required for connecting to the wireless network comprises:
      accessing the network address associated with the user-defined API through the wireless network,
      obtaining a network response to accessing the network address associated with the user-defined API through the wireless network, and
      determining that the secondary login verification is required for connecting to the wireless network based on, at least, matching the first web page data and the second web page data to generate a matching result indicating that the network response comprises specified identification information.

8. The non-transitory, computer-readable medium of claim 7, the operations further comprising in response to determining that a password is required for connecting to the wireless network, determining that the connection to the wireless network is a secure connection.

9. The non-transitory, computer-readable medium of claim 7, the operations further comprising:
   in response to determining that no secondary login verification is required for connecting to the wireless network, determining that the connection to the wireless network is not a secure connection; and
   in response to determining that a secondary login verification is required for connecting to the wireless network, determining that the connection to the wireless network is a secure connection.

10. The non-transitory, computer-readable medium of claim 7, wherein the wireless network is a wireless local area network (WLAN).

11. The non-transitory, computer-readable medium of claim 7, wherein determining that no password is required for connecting to the wireless network includes:
    calling, by a mobile device, a wireless network password management interface provided by an operating system of the mobile device;
    obtaining, by the mobile device, a call result in response to calling the wireless network password management interface; and
    determining, by the mobile device, that no password is required for connecting to the wireless network based on at least the call result.

12. The non-transitory, computer-readable medium of claim 11, wherein the operating system is an ANDROID operating system or an APPLE iOS operating system.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       determining that no password is required for connecting to a wireless network;
       in response to determining that no password is required for connecting to the wireless network, retrieving data from at least one predefined network address through the wireless network; and
       determining that a secondary login verification is required for connecting to the wireless network based on, at least, the data from the at least one predefined network address,
       wherein the at least one predefined network address comprises a first network address to access first web page data and a second network address to access second web page data the first network address and the second network address being associated with a user-defined application program interface (API), and determining that the secondary login verification is required for connecting to the wireless network comprises:
          accessing the network address associated with the user-defined API through the wireless network,
          obtaining a network response to accessing the network address associated with the user-defined API through the wireless network, and
          determining that the secondary login verification is required for connecting to the wireless network based on, at least, matching the first web page data and the second web page data to generate a matching result indicating that the network response comprises specified identification information.

14. The computer-implemented system of claim 13, the operations further comprising in response to determining that a password is required for connecting to the wireless network, determining that the connection to the wireless network is a secure connection.

15. The computer-implemented system of claim 13, further comprising:
  in response to determining that no secondary login verification is required for connecting to the wireless network, determining that the connection to the wireless network is not a secure connection; and
  in response to determining that a secondary login verification is required for connecting to the wireless network, determining that the connection to the wireless network is a secure connection.

16. The computer-implemented system of claim 13, wherein the wireless network is a wireless local area network (WLAN).

17. The computer-implemented system of claim 13, wherein determining that the password is required for connecting to the wireless network includes:
  calling, by a mobile device, a wireless network password management interface provided by an operating system of the mobile device;
  obtaining, by the mobile device, a call result in response to calling the wireless network password management interface; and
  determining, by the mobile device, that the password is required for connecting to the wireless network based on at least the call result.

18. The computer-implemented system of claim 17, wherein the operating system is an ANDROID operating system or an APPLE iOS operating system.

* * * * *

UNITED STATES PATENT AND TRADEMARK OFFICE
CERTIFICATE OF CORRECTION

PATENT NO. : 10,638,320 B2
APPLICATION NO. : 16/422777
DATED : April 28, 2020
INVENTOR(S) : Baochu Wang It is certified that error appears in the above-identified patent and that said Letters Patent is hereby corrected as shown below:

In the Specification

In Column 1, Line 12, after "2017," delete "which".

In the Claims

In Claim 7, Column 19, Line 38, after "least, the" delete "retrieved".

Signed and Sealed this
Thirteenth Day of October, 2020

Andrei Iancu
*Director of the United States Patent and Trademark Office*